(12) United States Patent
Orbeck et al.

(10) Patent No.: US 10,792,988 B2
(45) Date of Patent: Oct. 6, 2020

(54) HYBRID STEAM POWER DRIVE SYSTEM

(71) Applicants: Einar Arvid Orbeck, Las Vegas, NV (US); Ira Howard Robbins, Leona Valley, CA (US); John Edward Vandigriff, Carrollton, TX (US)

(72) Inventors: Einar Arvid Orbeck, Las Vegas, NV (US); Ira Howard Robbins, Leona Valley, CA (US); John Edward Vandigriff, Carrollton, TX (US)

(*) Notice: Subject to any disclaimer, the term of this patent is extended or adjusted under 35 U.S.C. 154(b) by 0 days.

(21) Appl. No.: 16/350,156

(22) Filed: Oct. 9, 2018

(65) Prior Publication Data
US 2019/0210445 A1    Jul. 11, 2019

Related U.S. Application Data

(63) Continuation-in-part of application No. 15/732,849, filed on Jan. 8, 2018, now abandoned.

(51) Int. Cl.
| | |
|---|---|
| *B60K 6/00* | (2006.01) |
| *H02K 7/00* | (2006.01) |
| *H02K 7/18* | (2006.01) |
| *F01K 7/16* | (2006.01) |
| *F01D 15/10* | (2006.01) |
| *H02K 11/00* | (2016.01) |
| *B60L 1/00* | (2006.01) |
| *H02K 53/00* | (2006.01) |

(52) U.S. Cl.
CPC .............. *B60K 6/00* (2013.01); *B60L 1/00* (2013.01); *F01D 15/10* (2013.01); *F01K 7/16* (2013.01); *H02K 7/006* (2013.01); *H02K 7/1823* (2013.01); *H02K 11/0094* (2013.01); *H02K 53/00* (2013.01); *B60Y 2200/92* (2013.01); *B60Y 2400/431* (2013.01)

(58) Field of Classification Search
CPC .......... B63H 21/06; B63H 21/10; B60K 6/26; B60K 6/30; B63B 2757/00
See application file for complete search history.

(56) References Cited

U.S. PATENT DOCUMENTS

| | | | | |
|---|---|---|---|---|
| 9,470,111 | B2* | 10/2016 | Firkan | F01K 15/04 |
| 10,018,078 | B2* | 7/2018 | Aho | F01K 15/02 |
| 2015/0042193 | A1* | 2/2015 | Galvan | H02K 53/00 |
| | | | | 310/113 |
| 2015/0233266 | A1* | 8/2015 | Firkan | F01K 15/04 |
| | | | | 60/650 |
| 2017/0137138 | A9* | 5/2017 | Hunter | B64D 27/24 |
| 2018/0020895 | A1* | 1/2018 | Betton | F04D 23/008 |
| | | | | 15/320 |

* cited by examiner

*Primary Examiner* — Brian L Swenson
(74) *Attorney, Agent, or Firm* — John E. Vandigriff

(57) ABSTRACT

A hybrid steam power drive system that uses electrical motors to power any type of vehicle. It includes a steam unit that drives a steam turbine that turns a generator to provide electricity directly to the electrical drive motors and continually charge a battery/capacitor bank which can also provide energy to the electrical drive motor(s). With this system the battery/capacitor bank is continually being charged and does not have to periodically be plugged into a power source to charge the battery/capacitor bank. It also provides an accessory outlet to power external needs when the vehicle is not in motion.

9 Claims, 2 Drawing Sheets

HYBRID STEAM POWER DRIVE SYSTEM

PRIOR APPLICATION

This application is a Continuation-in-Part of application Ser. No. 15/732,849 filed Jan. 8, 2018, entitled Hybrid Steam Power Drive System.

FIELD OF THE INVENTION

The invention relates to a drive system for all types of vehicles, and more particularly to an electrical drive system utilizing a steam unit steam turbine and an electrical generator for providing the electrical drive power.

BACKGROUND OF THE INVENTION

Automobiles, trucks, buses, motor homes, motorcycles, locomotives, water vessels, airplanes, propulsion and all other forms of transportation known as vehicles are powered by several different drive systems. Most common is the use of gasoline, natural gas, diesel, jet fuel, and other forms of fossil fuels to power engines and propellers. Some vehicles are powered by electrical power but have limited distance before the battery powering the electrical motors has to be charged. There are also hybrid systems that use both a gasoline engine and electrical motors to power these vehicles.

There are several patents that use steam to rotate a turbine which turns an alternator or generator. One such unit is described in U.S. Publication 2012/0159951 by Avery. The steam unit uses the combination of a flash boiler and a super heater to generate the steam. The flash boiler requires a fuel supply and a pump to supply fuel to the burner which heats the water in the flash boiler to produce steam. The present invention is distinct in that there is no flash boiler, fuel supply or a fuel pump.

Another boiler unit is described in U.S. Pat. No. 4,314,139. The unit in this patent uses an electrically conductive liquid in a vessel which contains a pool of the electrically conductive liquid. There are two electrodes, a first one is at a level above the pool of liquid in the vessel, and another one spaced above the first electrode. There is interaction between the two electrodes as liquid is projected between the two electrodes. There are other distinct differences which are not shown nor suggested in the present invention.

SUMMARY OF THE INVENTION

The present invention is to vehicle drive systems that use electrical motors to power the vehicles. A steam generator drives a steam turbine which turns a generator to provide electricity to continually charge a battery, a capacitor bank, or to supply power directly to the electrical drive motors. With this system, the battery/capacitor bank is continually being charged and does not have to be plugged into a power source to charge the battery/capacitor bank. The battery/capacitor bank can be charged while power is supplied directly to the drive motors. As such, there is always power to drive the electrical motors. The system can also be configured with drive systems that include front wheel drive, rear wheel drive or all wheel drive.

The hybrid steam power drive system of the present invention is distinct, from present electrical powered vehicles. It does not have a limited distance capability and does not have to be charged with external power sources while the vehicle is not in use. The hybrid steam power drive system may supply power to the drive motor while it continually charges the battery/capacitor bank that also may power the drive motors.

The description of the invention is directed to a drive system for all vehicles. The invention can be used in any apparatus that can be turned or rotated by an electrical motor such as propellers or wheels.

There is no pool of water in the steam unit. Water is flowed through the steam unit. The steam is produced by passing an electrical current between electrodes and through the water flowing through the steam unit. There is an instant conversion of the water to steam as the current flows between electrodes and through the water.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
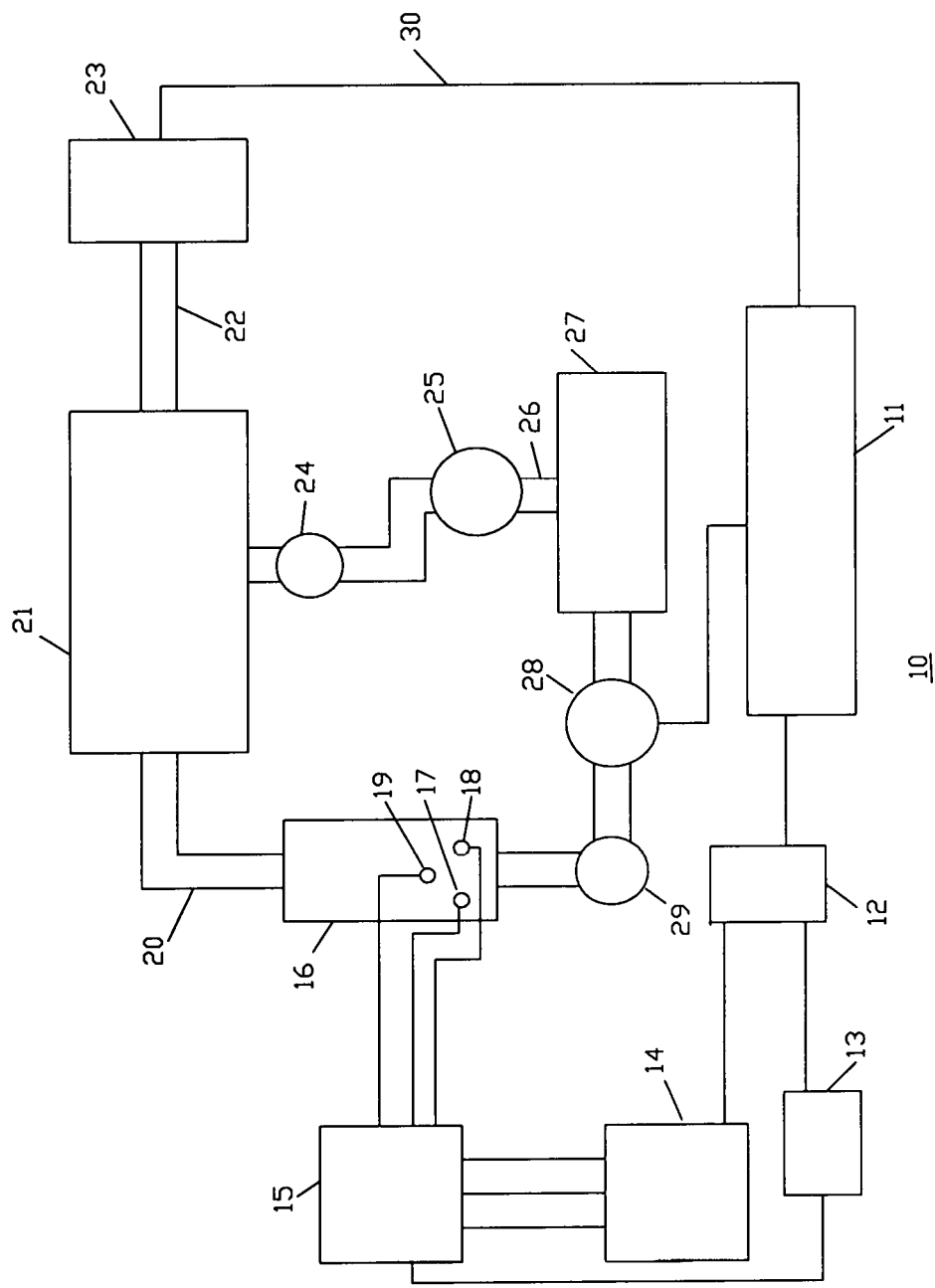
FIG. 1 illustrates a steam turbine system that drives a generator for providing voltage to charge a battery/capacitor bank, the battery/capacitor bank is to provide power to the electrical drive motors (not illustrated in FIG. 1) which provides power to any type of vehicle.

FIG. 1 shows a basic system for producing a voltage to charge battery/capacitor bank 11 that is supplying power to electrical motors that provides the power to a vehicle. The steam unit 16 generates steam delivering steam through 20 to rotate turbine 21. A water tank 27 supplies water to steam unit 16 by pump 28 which supplies a continuous flow of pressurized water to steam unit 16 through a one way valve 29. Valve 29 prevents steam and water introduced into the steam unit 16 from flowing back out of the steam unit 16 into pump 28. The 3 phase steam unit 16 is started in single phase by the control unit 13 which is powered by power inverter 12. The control unit 13 sends signal to power control unit 15 which supplies power to conductors 17 and 18 which supplies power to internal extension of the conductors within the steam unit. Immediately upon startup of the system, the control unit 13 applies power to the "single phase to 3 phase" converter 14 through power inverter 12. Power control unit 15 is now being fed 3 phase power which is applied to conductor 19 completing the transition from single phase to 3 phase operation. The electrical conductors 17, 18, and 19 are insulated from the steam unit 16 as they extend through the wall of the steam unit and into the steam unit 16. Pressurized water is inserted into steam unit 16 from water tank 27 through pump 28 and then through one way valve 29. The water then flows across and around the internal portions of electrical conductors 17, 18 and 19. Electrical conductors 17, 18 and 19 are connected to electrodes which are the internal portions of the electrical conductors (not illustrated) which extend through steam unit 16. The voltage applied to conductors 17, 18 and 19 through power control unit turns the pressurized water instantly into steam. As the water flows through the steam unit 16, and around the electrodes in the steam unit, current flows between the electrodes, and through the water, converting the water instantly into steam. There is no pool of water in the steam unit 16. The steam flows out of steam unit 16 through 20 into turbine 21. Turbine 21 turns shaft 22 turning the generator 23 creating voltage used to charge the battery/capacitor bank 11 through connection 30. The steam then exits the turbine 21 through one way valve 24 into condenser 25 and then passes through pipe 26 back into the water tank 27 for the reuse of the water.

Figure 2:
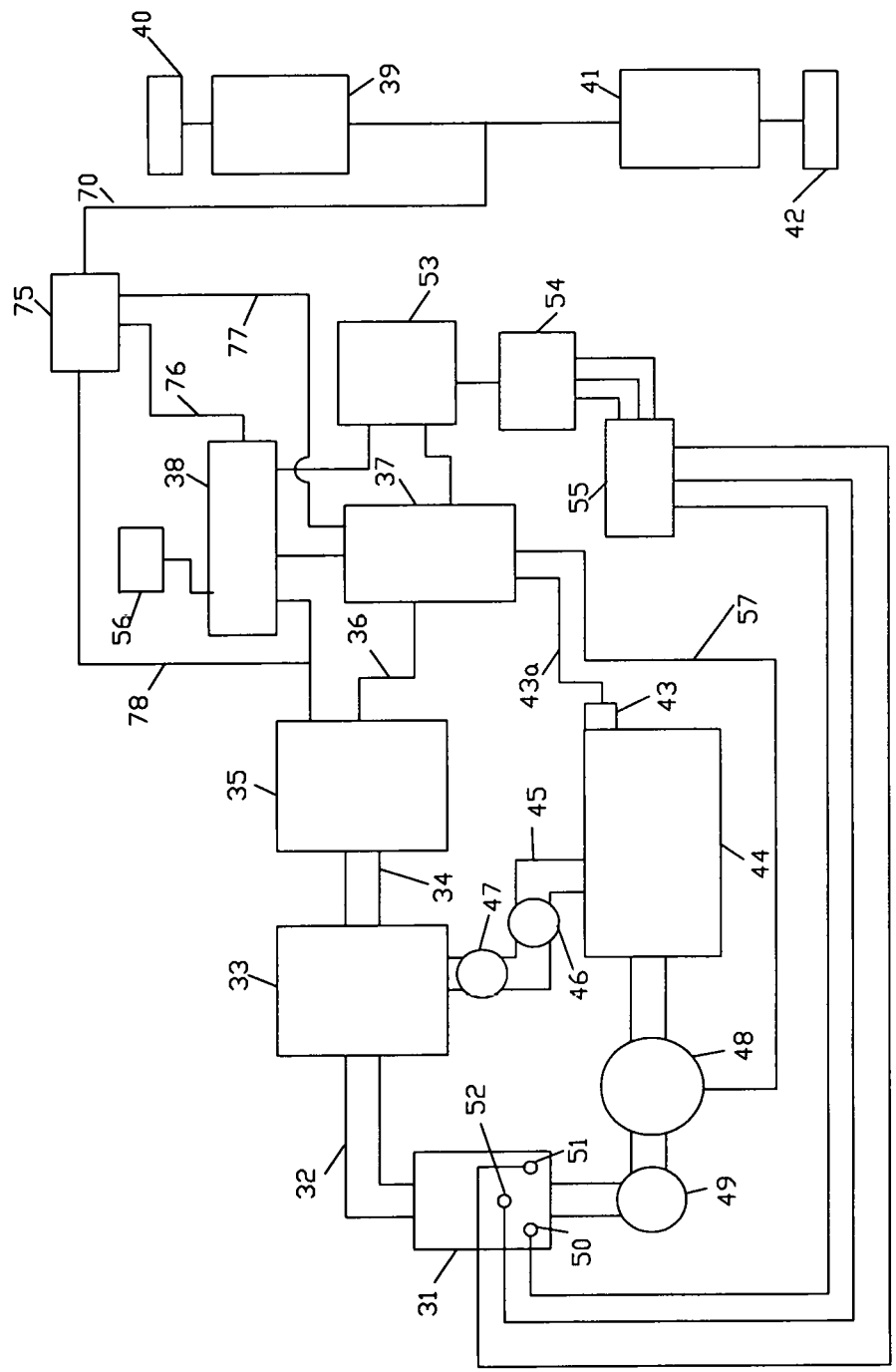
FIG. 2 illustrates an example of a steam generation system in combination with a steam turbine and an electrical generator to provide electrical power to a battery/capacitor or directly to electrical motors which drive a vehicle, a control circuitry to interact with the electrical drive system and a water supply for providing water to the steam generation unit.

FIG. 2 illustrates a system for providing power to drive a vehicle. It could be called a hybrid steam power drive system, using steam for providing power to electrical motors. The only fuel source used to provide electricity to the electric motors is water.

A steam unit 31 generates high pressure steam by moving water from water tank 44 through pump 48 and one way valve 49 into the steam unit 31. The water flows around three electrical conductors 50, 51 and 52 in steam unit 31. Voltage is applied to the 3 phase electrical conductors 50, 51 and 52 from power control unit 55. As water flows through the steam unit 31 across the electrical conductors 50, 51 and 52, current flows through the water between electrical conductors 50, 51, and 52 turning the water flowing across them into steam.

Control unit 37 is connected to battery/capacitor bank 38. The electric motors 39 and 41 which turn drive systems 40 and 42 are powered by battery/capacitor bank 38 through connection 76 through switch 75 to connection 70, or directly by generator through connection 78 and switch 75 to connection 70. Battery/capacitor bank 38 receives charging voltage from generator 35. Power inverter 53 supplies power to control unit 37. Control unit 37 monitors the charge on battery/capacitor bank 38. If the battery/capacitor bank 38 does not have a low charge, then the steam unit 31 can be shut down temporarily by not supplying power or water to the steam unit. When the control unit 37 senses that the battery has a low charge, the steam unit is automatically turned on to power turbine 33 which will rotate generator 35 and supply power to the battery/capacitor bank 38. Control unit 37 regulates the output of generator 35 to battery/capacitor bank 38 through connection 36. The output of both the battery/capacitor bank 38 and generator 35 are connected to switch 75, battery/capacitor bank though connection 76 and the generator 35 through connection 78. Control unit 37 is connected to switch 75 through connection 77. This way control unit 37 can allow the drive motors 39 and 41 to be powered directly by generator 35 or battery/capacitor bank 38.

Power control unit 55 supplies the power to conductors 50, 51 and 52 on steam unit 31. The power supplied to conductors 50, 51 and 52 converts the water that pump 48 flows from water tank 44 through one way valve 49 into steam unit 31. The steam produced is directed through 32 into turbine 33. The spent steam in the turbine will be directed through one way valve 47 into condenser 46 through pipe 45 into water tank 44 to be reused. Water tank 44 includes a water level gauge 43 which monitors the level of the water in the tank through connection 43a. The monitored information is sent to control unit 37 to alert the control unit 37 that the water is low in water tank 44 and that additional water needs to be supplied to the water tank 44. Water will not be needed often since the water from the condensed steam is supplied back into the water tank.

Since the generator 35 is being driven by turbine 33 through shaft 34 the hybrid steam power drive system charges the battery/capacitor bank 38. It is not necessary to plug the hybrid steam power drive system into an electrical outlet when not in use. However, a power outlet 56 connected to batter/capacitor bank to supply external electrical needs when the hybrid steam power drive system is not in motion.

What is claimed:

1. A hybrid steam power drive system for rotating wheels or propellers a vehicle, including electrical motors powered by at least one battery and including a steam unit, steam being produced by passing a continuous flow of water between and around three electrodes to which a three phase power voltage is applied, and a steam turbine for driving a generator which provides an electrical power source for charging the battery, a water tank for supplying water to the steam unit, the water being converted to steam to drive the steam turbine, and said electrical motors for turning wheels which move the vehicles.

2. The hybrid steam power drive system according to claim 1, including a control unit to control the charging of a battery/capacitor bank and for providing power to the steam unit, and a pump for supplying the continuous flow of water to the steam unit from the water tank; and when the control unit senses that the a battery/capacitor bank has a low charge, the steam unit is automatically turned on to power the steam turbine which will rotate the generator and supply power to the battery/capacitor bank.

3. The hybrid steam power drive system according to claim 1, including a battery/capacitor bank, the water from the water tank supplied to the steam unit, which drives the steam turbine which drives the generator that provides power to charge the battery/capacitor bank, and a control unit for monitoring the battery/capacitor bank, and for controlling the steam unit so it does not produce steam when the battery/capacitor bank is fully charged.

4. The hybrid steam power drive system according to claim 1, wherein the steam turbine has an outlet where steam and any water which exits the turbine through a one way valve flows into a condenser, wherein any steam is condensed and returned to the water tank, and the water tank has a water level indicator which supplies information to a control unit to indicate that the water in the tank is low.

5. The hybrid steam power drive system according to claim 1, containing a battery/capacitor bank and a control unit which controls the power used charging the battery/capacitor bank.

6. The hybrid steam power drive system according to claim 1, wherein water from the water tank supplies a continuous flow of water to the steam unit which provides a high flow of pressurized steam to the steam turbine and which drives the generator which provides power to charge the battery/capacitor bank, a control unit for monitoring the battery/capacitor bank and supplying power to the electrical drive motor.

7. A hybrid steam power drive system including electrical motors which are battery driven, the battery charged by a generator which is turned by a steam turbine, the steam supplied to the steam turbine is from a steam unit in which the steam is produced by inserting a continuous flow of water into a housing containing "single to three phase" convertible electrical conductors, when a voltage is applied to the electrical conductors, current flows through the water in the housing and converts the water to steam, electrical motors attached to and turning a shaft which rotates and turns a driving and moving device for, but not limited to, Automobiles, trucks, buses, motor homes, motorcycles, locomotives, water vessels, and airplanes.

8. A hybrid steam power drive system according to claim 7 in which a unit is included on the airplane has the ability to condense water from atmospheric conditions in flight to refill a water tank.

9. A hybrid steam power drive system according to claim 7 in which a water vessel has the ability to use a body of water as a source of water instead of using a water tank, water used in the steam power drive is then recycled as clean water back into the body of water.

\* \* \* \* \*